United States Patent
Shibata et al.

(10) Patent No.: US 7,222,485 B2
(45) Date of Patent: May 29, 2007

(54) HYDROSTATIC CONTINUOUSLY VARIABLE TRANSMISSION

(75) Inventors: Takashi Shibata, Sakai (JP); Yoshio Tomiyama, Osaka (JP); Takashi Kuramoto, Sakai (JP); Hiroshi Shimada, Nara (JP); Takeshi Komorida, Sakai (JP); Kenji Nishihara, Nishinomiya (JP); Masashi Osuga, Nara (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/376,757

(22) Filed: Mar. 15, 2006

(65) Prior Publication Data

US 2006/0283183 A1    Dec. 21, 2006

(30) Foreign Application Priority Data

Jun. 21, 2005  (JP)  .............................. 2005-180833

(51) Int. Cl.
*F16H 61/40* (2006.01)
*B60K 11/00* (2006.01)

(52) U.S. Cl. .......................................... 60/456; 60/487

(58) Field of Classification Search ................. 60/456, 60/487, 489
See application file for complete search history.

(56) References Cited

U.S. PATENT DOCUMENTS 4,627,237 A * 12/1986 Hutson ........................ 60/487

6,073,443 A    6/2000 Okada et al.
6,237,332 B1 * 5/2001 Thoma et al. ................. 60/456
2006/0013705 A1 * 1/2006 Sakikawa .................... 417/360

FOREIGN PATENT DOCUMENTS

JP    8-145168    4/1996

* cited by examiner

*Primary Examiner*—Thomas E. Lazo
(74) *Attorney, Agent, or Firm*—The Webb Law Firm

(57) ABSTRACT

A hydrostatic continuously variable transmission comprises: a hydraulic pump; a power input shaft engaged with the hydraulic pump to transmit power from a power source to the hydraulic pump; a hydraulic motor in hydraulic communication with the hydraulic pump; a casing that houses the hydraulic pump and the hydraulic motor; a port block mounted to the casing, the port block having a block main body and a cover member connected to a power input side of the block main body, said cover member having an outer surface; a cooling hydraulic path provided in the port block in a region where the block main body and the cover member meet, the cooling hydraulic path being connected to a first hydraulic path in the port block, the cooling hydraulic path having a plurality of bends; a cooling fan provided on the power input shaft to provide air flow directly to the outer surface of the cover member.

12 Claims, 11 Drawing Sheets

HYDROSTATIC CONTINUOUSLY VARIABLE TRANSMISSION

BACKGROUND OF THE INVENTION

The present invention relates to a hydrostatic continuously variable transmission which is used as an automotive transmission in various work vehicles, such as a tractor, a lawnmower, a combine harvester, a rice transplanter, and the like.

In hydrostatic continuously variable transmissions (HSTs), hydraulic fluid needs to be cooled since the hydraulic fluid is heated by friction. For example, as disclosed in JP No. 8-145168 A, charge fluid pumped from a charging pump is cooled through an oil cooler before being supplied into a charge fluid path.

Conventionally, the oil cooler is provided in a cooling air path in a radiator of an engine, and the oil cooler is connected to related devices via external pipes. A number of parts for connecting the pipes are required, and piping requires much labor.

SUMMARY OF THE INVENTION

In view of this, an object of the present invention is to provide a simple cooling structure of a hydrostatic continuously variable transmission.

A hydrostatic continuously variable transmission in accordance with the present invention comprises: a hydraulic pump; a power input shaft engaged with the hydraulic pump to transmit power from a power source to the hydraulic pump; a hydraulic motor in hydraulic communication with the hydraulic pump; a casing that houses the hydraulic pump and the hydraulic motor; a port block mounted to the casing, the port block having a block main body and a cover member connected to a power input side of the block main body, said cover member having an outer surface; a cooling hydraulic path provided in the port block in a region where the block main body and the cover member meet, the cooling hydraulic path being connected to a first hydraulic path in the port block, the cooling hydraulic path having a plurality of bends; a cooling fan provided on the power input shaft to provide air flow directly to the outer surface of the cover member.

DETAILED DESCRIPTION OF PREFERRED EMBODIMENTS

Figure 1:
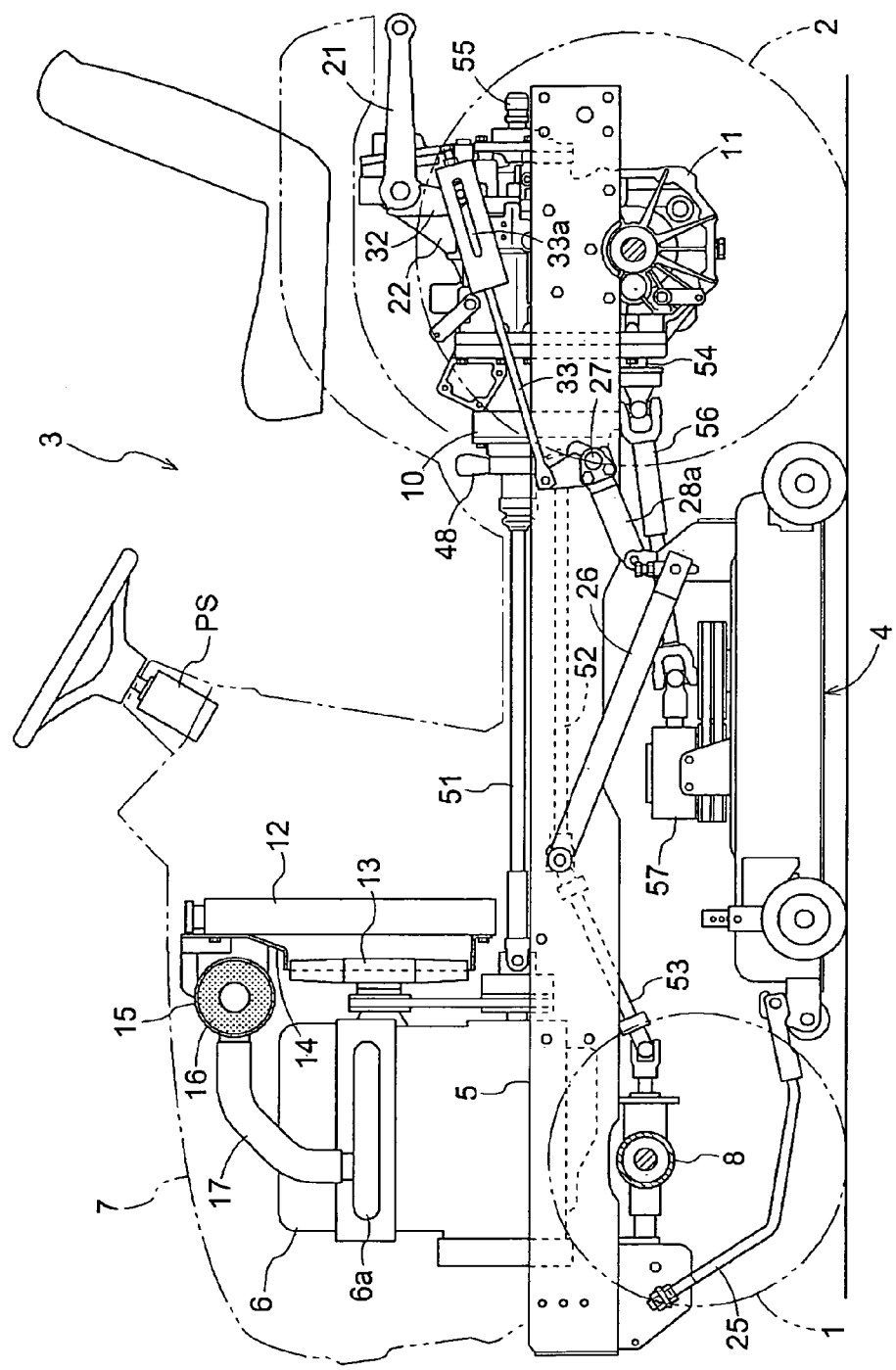
FIG. 1 is a side view of a whole tractor.
Figure 2:
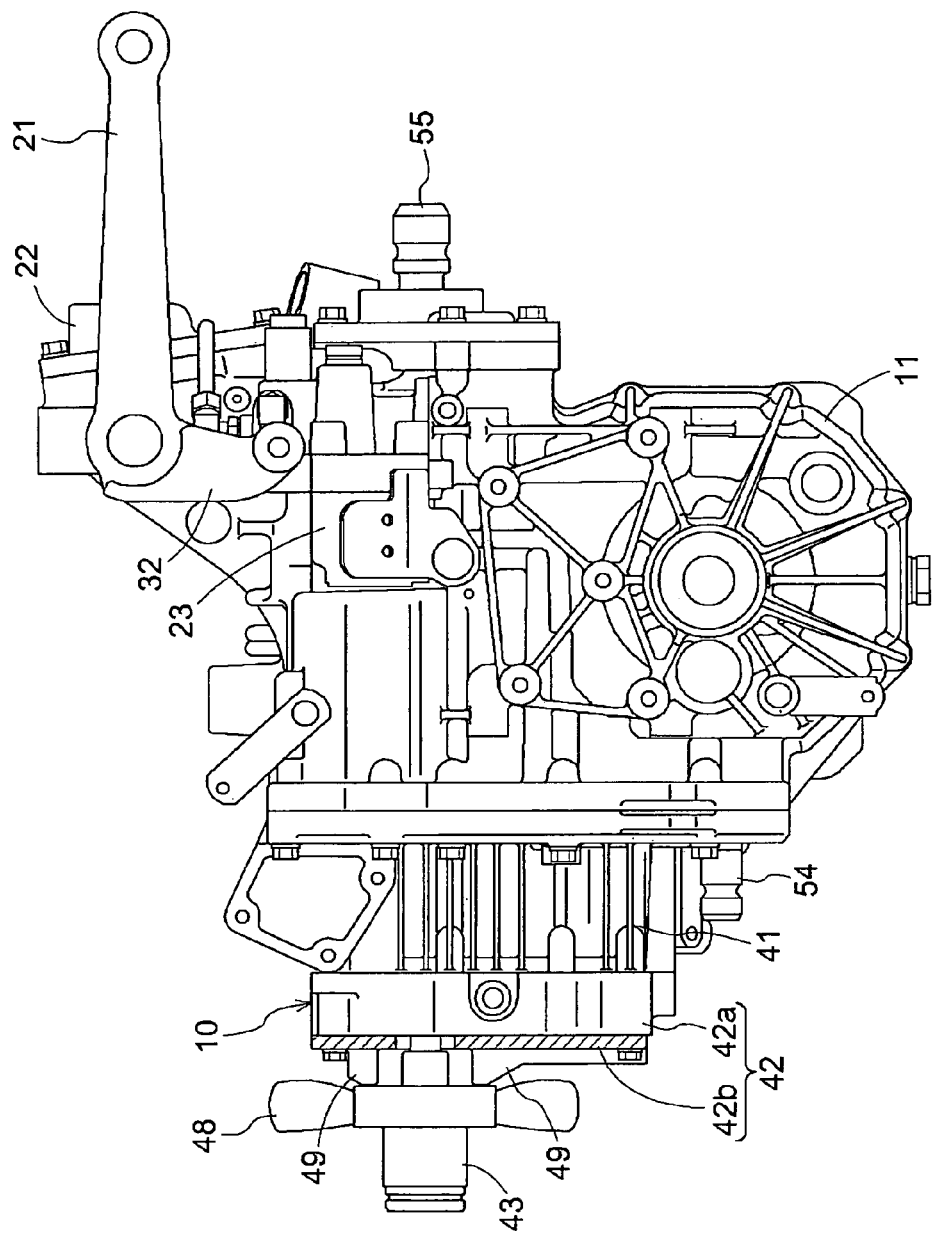
FIG. 2 is a side view of a mission case.
Figure 3:
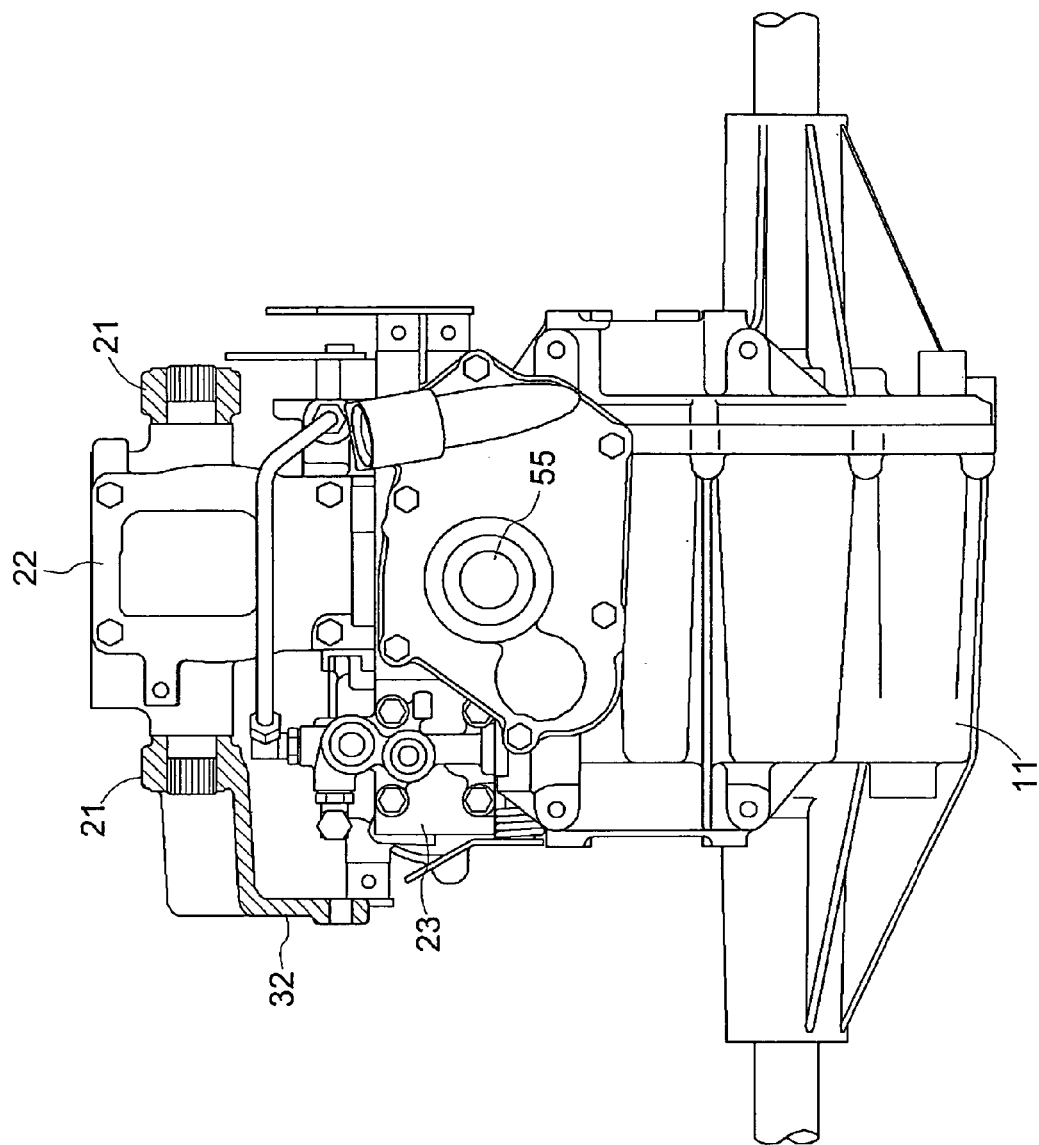
FIG. 3 is a rear view of the mission case.
Figure 4:
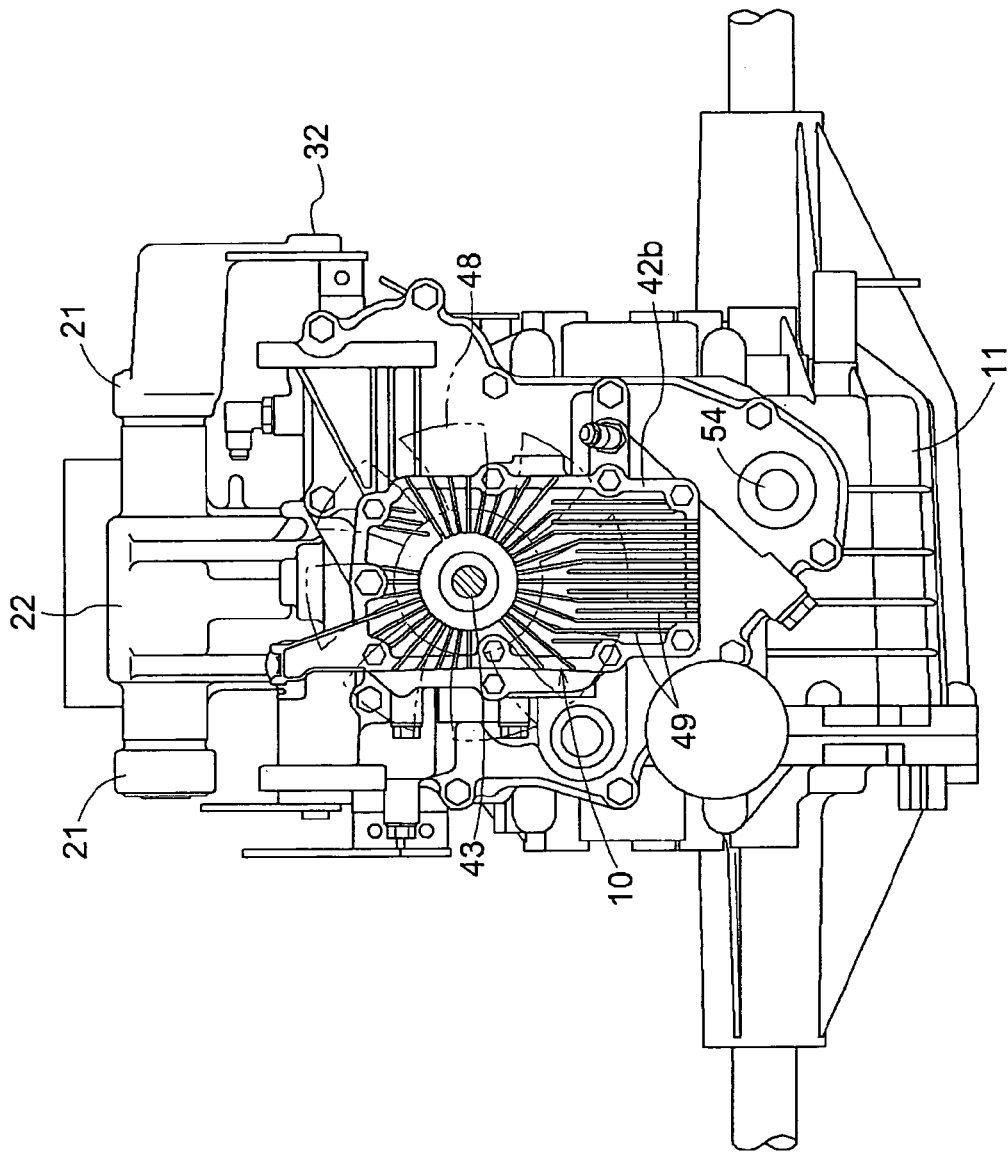
FIG. 4 is a front view of the mission case.
Figure 5:
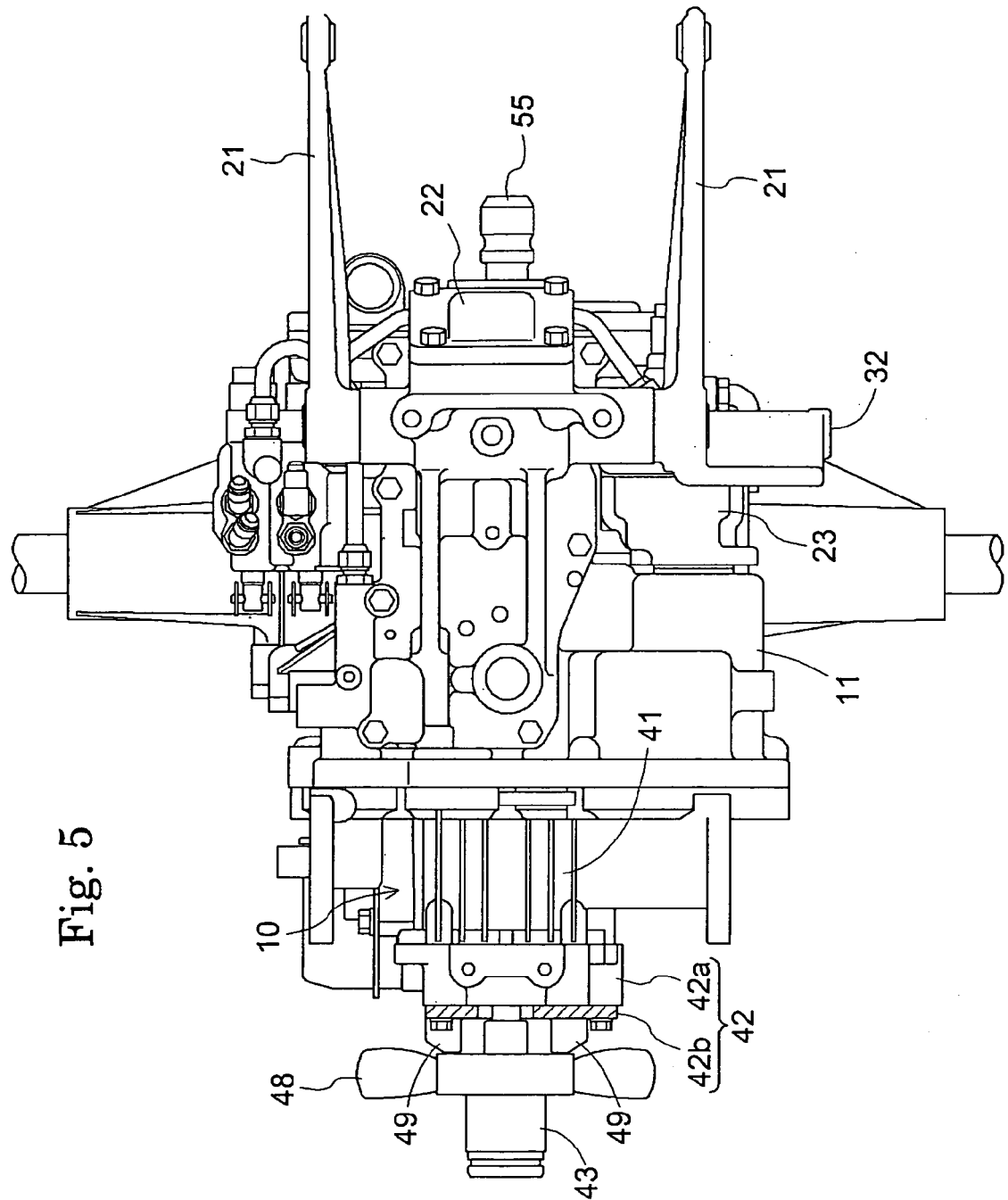
FIG. 5 is a plan view of the mission case.

FIG. 1 illustrates a general-purpose tractor which is an exemplary work vehicle in which a hydrostatic continuously variable transmission is used as an automotive transmission. The tractor is configured as a lawnmower, in which a mower 4 is linked to a lower portion of a four-wheel drive vehicle 3 comprising a small-diameter front wheel 1 which is controlled by a power steering operation, and a large-diameter rear wheel 2 (main drive wheel), in a manner which allows the mower 4 to freely move upward and downward.

The vehicle 3 includes a pair of left and right main frames 5 made of thick board material which are extending from the front to the rear. An engine 6 (power source) is provided at a front portion of the main frame 5 with a rotation axis center thereof being directed back and forth, and is covered with a bonnet 7. A front axle case 8 which supports the front wheel 1 is linked to a lower front portion of the main frame 5 in a manner which allows the front axle case 8 to roll. A transmission case 11 to a front side of which a hydrostatic continuously variable transmission 10 is linked, is linked to a rear portion of the main frame 5. A power output from the engine 6 is transmitted via a transmission shaft 51 to the hydrostatic continuously variable transmission 10, in which the power is in turn subjected to continuously variable transmission in a forward or backward direction, and thereafter, is subjected to gear transmission in the transmission case 11, so that the power is transmitted to the left and right rear wheels 2. A portion of the traveling power is extracted toward the front of the vehicle and is transmitted via transmission shafts 52 and 53 to the front axle case 8, in which the left and right front wheels 1 are in turn driven to the same speed as that of the rear wheel 2. In addition, a portion of the power transmitted to the transmission case 11 is transmitted to a front PTO shaft 54 and a rear PTO shaft 55 without via the hydrostatic continuously variable transmission 10. Working power which is extracted by the front PTO shaft 54 is transmitted via a telescopic transmission shaft 56 to a power input case 57 of the mower 4.

Figure 9:
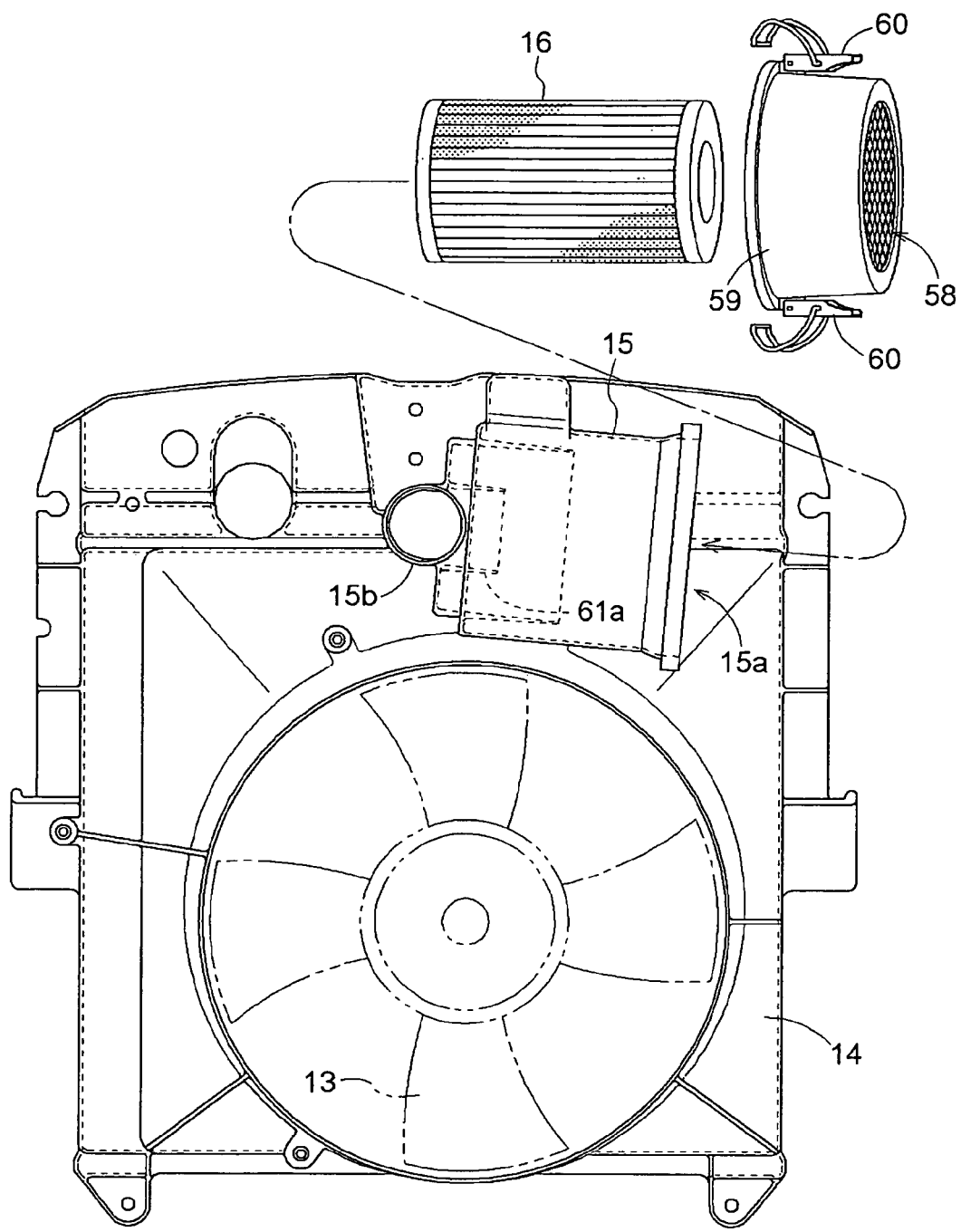
FIG. 9 is a front view of a fan shroud.
Figure 10:
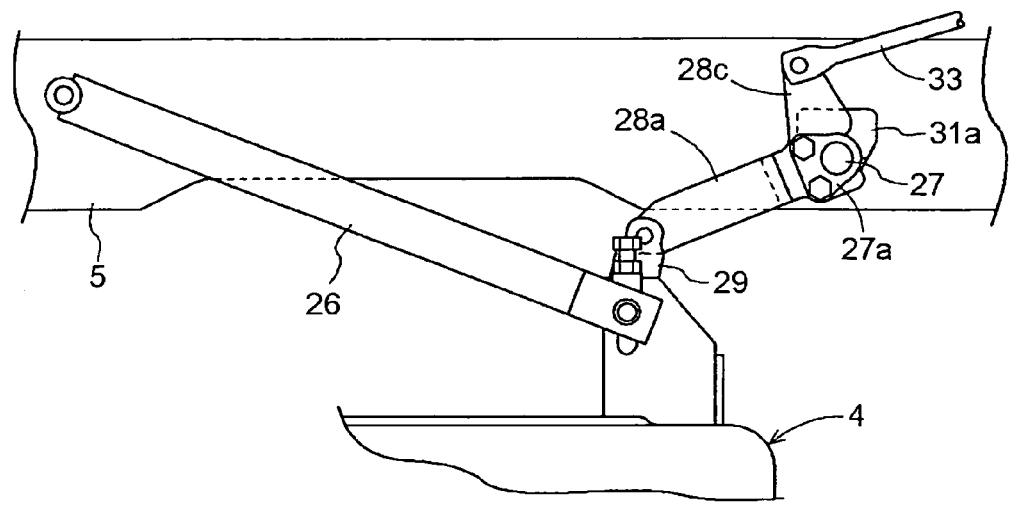
FIG. 10 is a side view of a mower suspending and supporting structure.

The engine 6 is provided with a radiator 12 at the rear thereof. A cooling fan 13 which is driven by the engine power is provided between the engine 6 and the radiator 12. A fan shroud 14 is provided, surrounding the cooling fan 13. The fan shroud 14 is produced by resin molding. A cleaner case portion 15 is integrated with the fan shroud 14 at a front portion of the fan shroud 14. As illustrated in FIG. 9, a large-diameter opening 15a is formed in a side wall of the cleaner case portion 15. A cap 59 having an air vent 58 with a dust collector is detachably attached via a buckle 60 to the opening 15a. A boss portion 61 is integrated with the opening 15a at an inner deep portion of opening 15a. A cylinder-shaped cleaner element 16 is engaged with and supported by the boss portion 61. By removing the cap 59 to open the opening 15a, the cleaner element 16 can be easily inserted or extracted for replacement from a lateral direction of the vehicle. A hose connecting opening 15b is formed in a front portion of the cleaner case portion 15 and is in communication with the boss portion 61. The hose connecting opening 15b is connected in communication with an intake manifold 6a of the engine 6 via an intake hose 17, so that air cleaned through the cleaner element 16 is taken into the engine 6 as air for combustion.

A pair of left and right lift arms 21 are provided above a rear portion of the transmission case 11 so as to move upward and downward a working apparatus linked to a rear portion of the vehicle via a three-point linking mechanism or the like (not shown). A single-action lift cylinder 22 for driving the lift arm 21 to swing is provided closer to one lateral side of the transmission case 11. A gear pump 23 which is a hydraulic fluid supply source for the lift cylinder 22 and the like is externally linked to the rear portion of the transmission case 11 and is provided closer to the other lateral side of the transmission case 11 opposite to the lateral side to which the cylinder is closer. The gear pump 23 is linked to the transmission system in the transmission case 11 so that the gear pump 23 is driven in association with the transmission system. Note that, as illustrated in a hydraulic circuit diagram of FIG. 8, the flow of hydraulic fluid from the gear pump 23 is divided via a flow priority valve V0. The control flow is supplied to a controller PS of a power steering cylinder 65 for steering the front wheel, and a switching valve V1 for switching on/off a multi-plate PTO clutch 66 present in a transmission system to the front PTO shaft 54 and the rear PTO shaft 55. An excess flow from the flow priority valve V0 is supplied to a control valve V2 of the hydraulic cylinder 22 for driving the lift arm 21.

The mower 4 is supported via a front link 25 and a rear link 26 which are linked to the main frame 5 in a manner which allows the mower 4 to translate upward and downward. A pair of left and right lift arms 28a and 28b are attached to rear portions of the main frames 5 via a supporting shaft 27. The arms 28a and 28b are vertically swung in an integrated manner. The free ends of the lift arm 28a and 28b are linked to the left and right rear links 26, respectively, via a middle link 29. When the lift arms 28a and 28b are vertically swung, the mower 4 is moved upward and downward. The lift arms 28a and 28b can be retrofitted to the main frames 5, and the attached structure will be described as follows.

Figure 11:
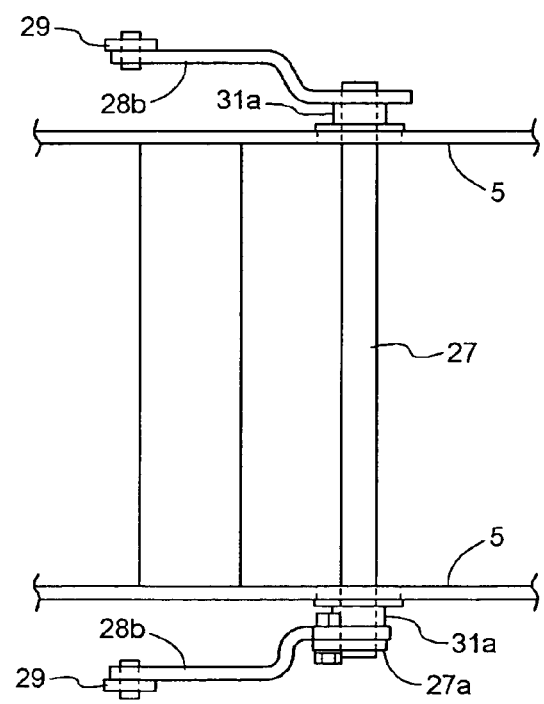
FIG. 11 is a plan view of a lift arm for suspending a mower.
Figure 12:
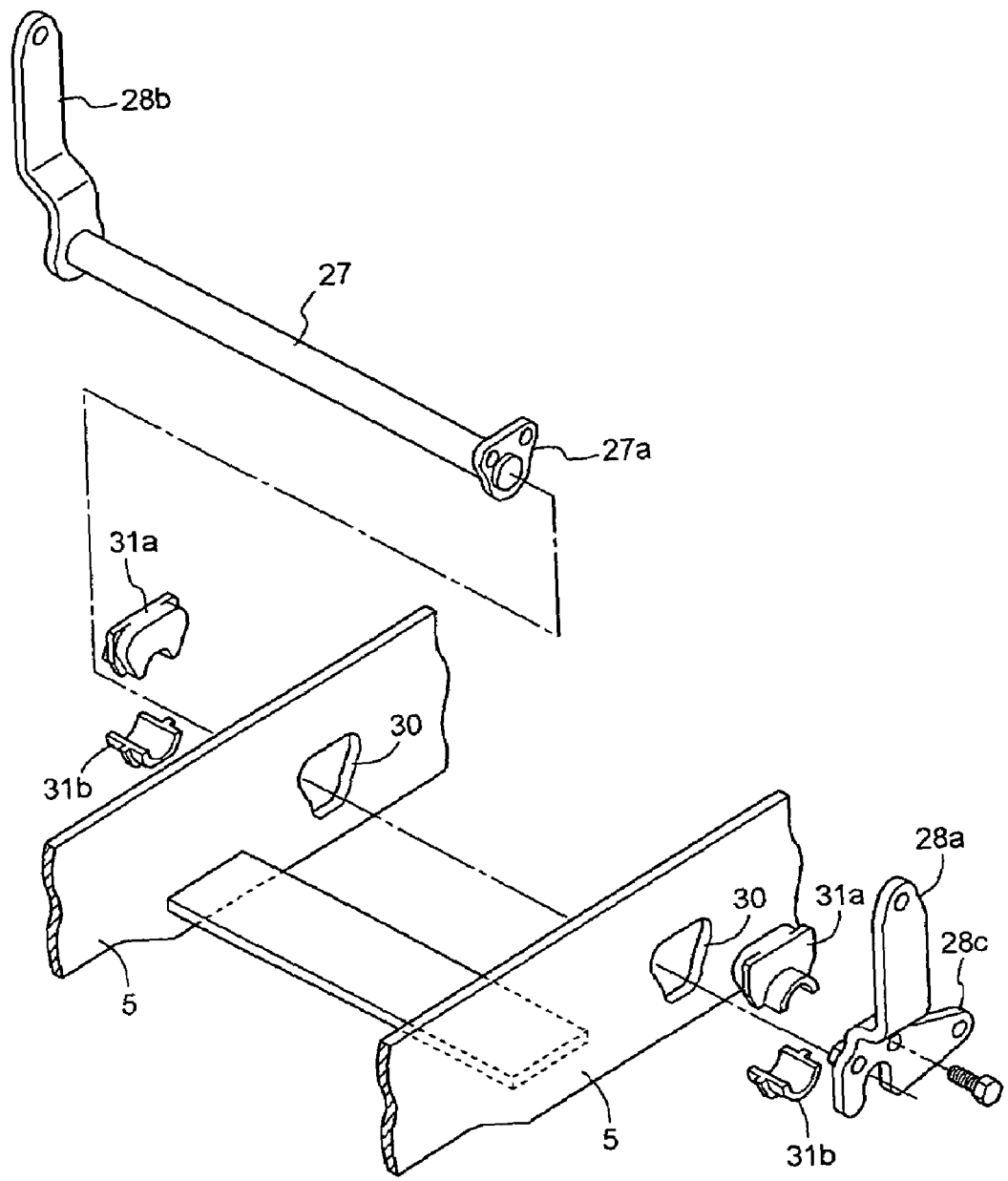
FIG. 12 is an exploded perspective view of a lift arm assembly structure.

Specifically, as illustrated in FIGS. 11 and 12, of the pair of left and right lift arms 28a and 28b, the right lift arm 28b is welded and fixed to the supporting shaft 27, and the left lift arm 28a is detachably bolted to a linking flange 27a provided to the supporting shaft 27. Substantially triangular attachment holes 30 for passing the linking flange 27a are formed in the right and left main frames 5. The supporting shaft 27 is supported via a two-part structure bearing member (bearing members 31a and 31b) which is engaged and attached to the attachment hole 30 from the outside, in a manner which allows the supporting shaft 27 to freely rotate.

The lift arm is attached as follows. Initially, while the left lift arm 28a is detached, the supporting shaft 27 is inserted into the attachment hole 30 on the right side of the vehicle from the linking flange 27a side, and further, the linking flange 27a is protruded leftward and outward from the attachment hole 30 on the left side of the vehicle. Next, the bearing members 31a and 31b are fitted to the supporting shaft 27 outside the frame and are engaged with the substantially triangular attachment hole 30 in a manner which does not allow the bearing members 31a and 31b to rotate. Next, the lift arm 28a is bolted with an inner surface of the linking flange 27a exposed on the left side of the vehicle. Thereby, the left and right lift arms 28a and 28b are provided on both the left and right outer sides of the main frames 5 in a manner which allows the left and right lift arms 28a and 28b to swing in an integrated manner. In this state, the supporting shaft 27 is prevented by the left and right lift arms 28a and 28b and the bearing members 31a and 31b from moving in the axial direction, and the bearing members 31a and 31b cannot be pulled out of the attachment hole 30.

An operation arm 28c is integrated with and extended from a base portion of the lift arm 28a attached to the linking flange 27a. A working arm 32 is extended downward from a base portion of the lift arm 21 provided on a left side of the rear portion of the transmission case 11. The working arm 32 and the operation arm 28c are linked to each other via an association rod 33 so that the working arm 32 and the operation arm 28c are moved in association with each other. Therefore, when the lift arm 21 is raised by hydraulic drive, the working arm 32 is rotated in the same direction, so that the lift arms 28a and 28b swing in a direction which lifts the mower. When the lift arm 21 is lowered, the mower 4 goes downward due to its own weight. Note that the working arm 32 and the association rod 33 are linked with each other via a pin in an oblong hole guide 33a so that the mower 4 can be allowed to be lifted even in the fixed state of the working arm 32 when an upward external force is applied to the mower 4 since, for example, the mower 4 runs on a bump on the ground.

Figure 8:
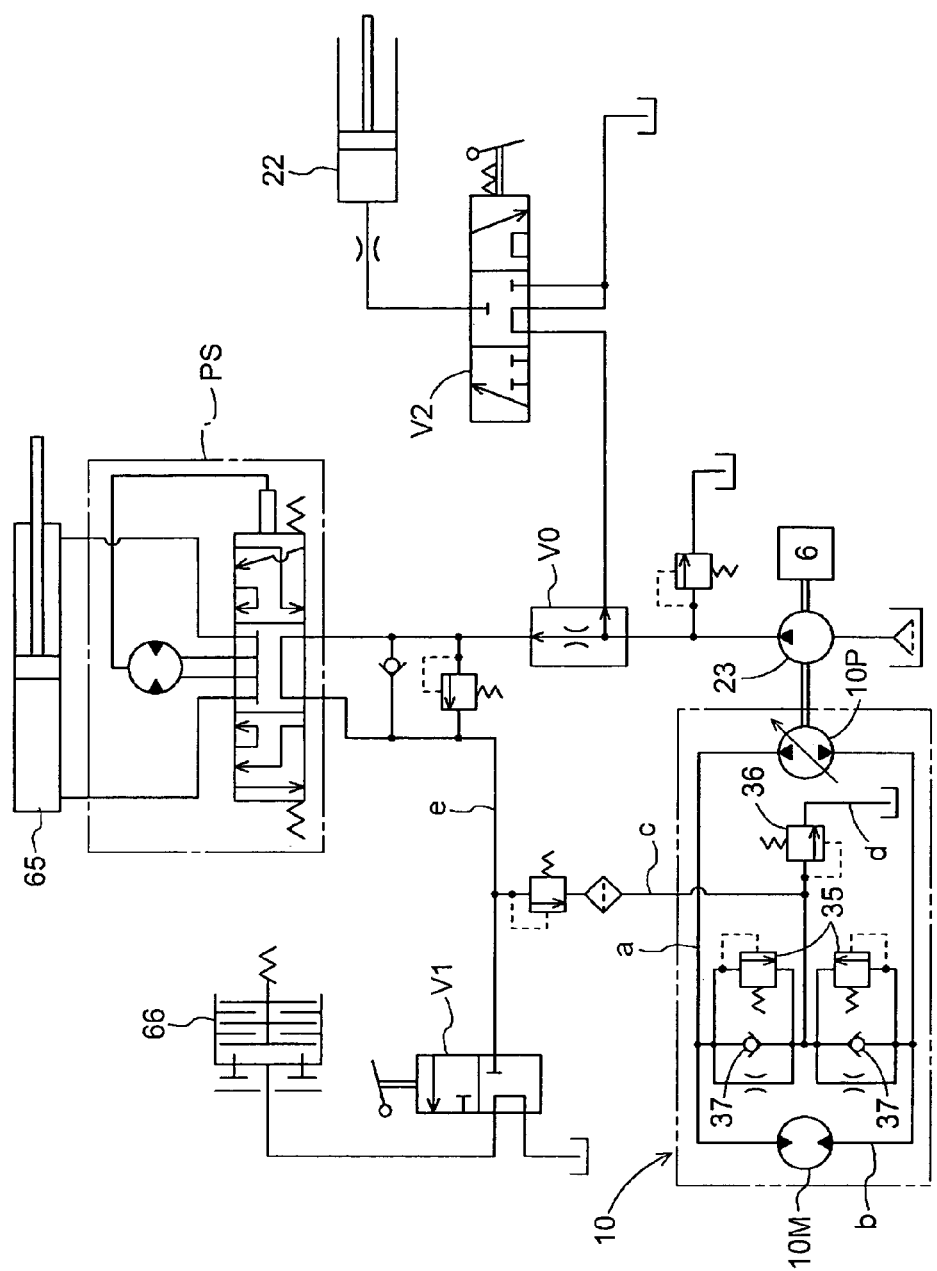
FIG. 8 is a hydraulic circuit diagram.

The hydrostatic continuously variable transmission 10 has an axial-plunger variable-capacity hydraulic pump 10P and an axial-plunger fixed-capacity hydraulic motor 10M, which are connected via speed control fluid paths a and b, as illustrated in the hydraulic circuit diagram of FIG. 8. The hydrostatic continuously variable transmission 10 is configured so that, by changing a discharging direction and a discharged amount of hydraulic fluid by changing an angle of a swash-plate of the pump 10P, the rotational power of the motor 10M can be continuously changed in a forward direction (advancing direction) or a backward direction (retreating direction). A circuit protecting safety valve 35 for limiting a circuit pressure, and a charge fluid path c for supplying hydraulic fluid to the speed control fluid paths a and b to compensate for hydraulic fluid leakage, are connected to the speed control fluid paths a and b. The charge fluid path c is connected in communication with a hydraulic fluid path e for supplying hydraulic fluid to the PTO clutch 66 so that hydraulic fluid is supplied via a check valve 37 to the speed control hydraulic fluid path "a" or the speed control hydraulic fluid path "b" on which charge fluid set by a relief valve 36 has a lower pressure. Excess hydraulic fluid which flows out of the relief valve 36 is returned to the transmission case 11 via a hydraulic fluid path d.

Figure 6:
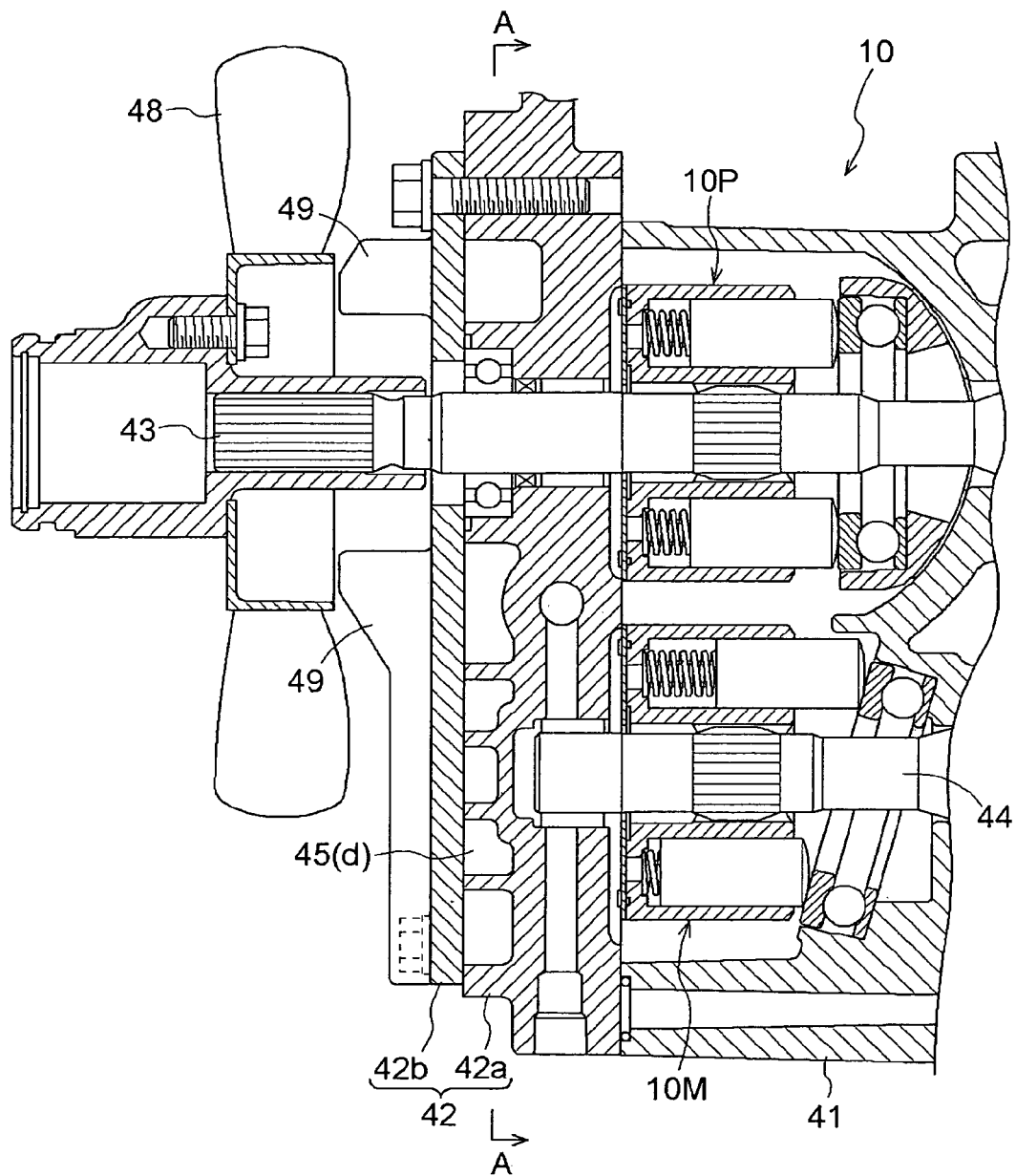
FIG. 6 is a cross-sectional side view of a hydrostatic continuously variable transmission.

As illustrated in FIG. 6, a casing for the hydrostatic continuously variable transmission 10 has a speed change casing 41 which accommodates the pump 10P and the motor 10M and whose front side is open, and a port block 42 linked to the front side. A power input shaft 43 of the pump 10P is protruded forward from the port block 42 and is linked to a rear end of the transmission shaft 51 extended from the engine 6, while a power output shaft 44 of the motor 10M is inserted into the transmission case 11 and is linked to a auxiliary gear speed change mechanism (not shown) in a manner which allows the power output shaft 44 to move in association with the auxiliary gear speed change mechanism. Note that the power input shaft 43 is inserted into the transmission case 11 and is linked to a PTO transmission system and a transmission system of the gear pump 23 in a manner which allows the power input shaft 43 to move in association with the PTO transmission system and the transmission system of the gear pump 23.

Figure 7:
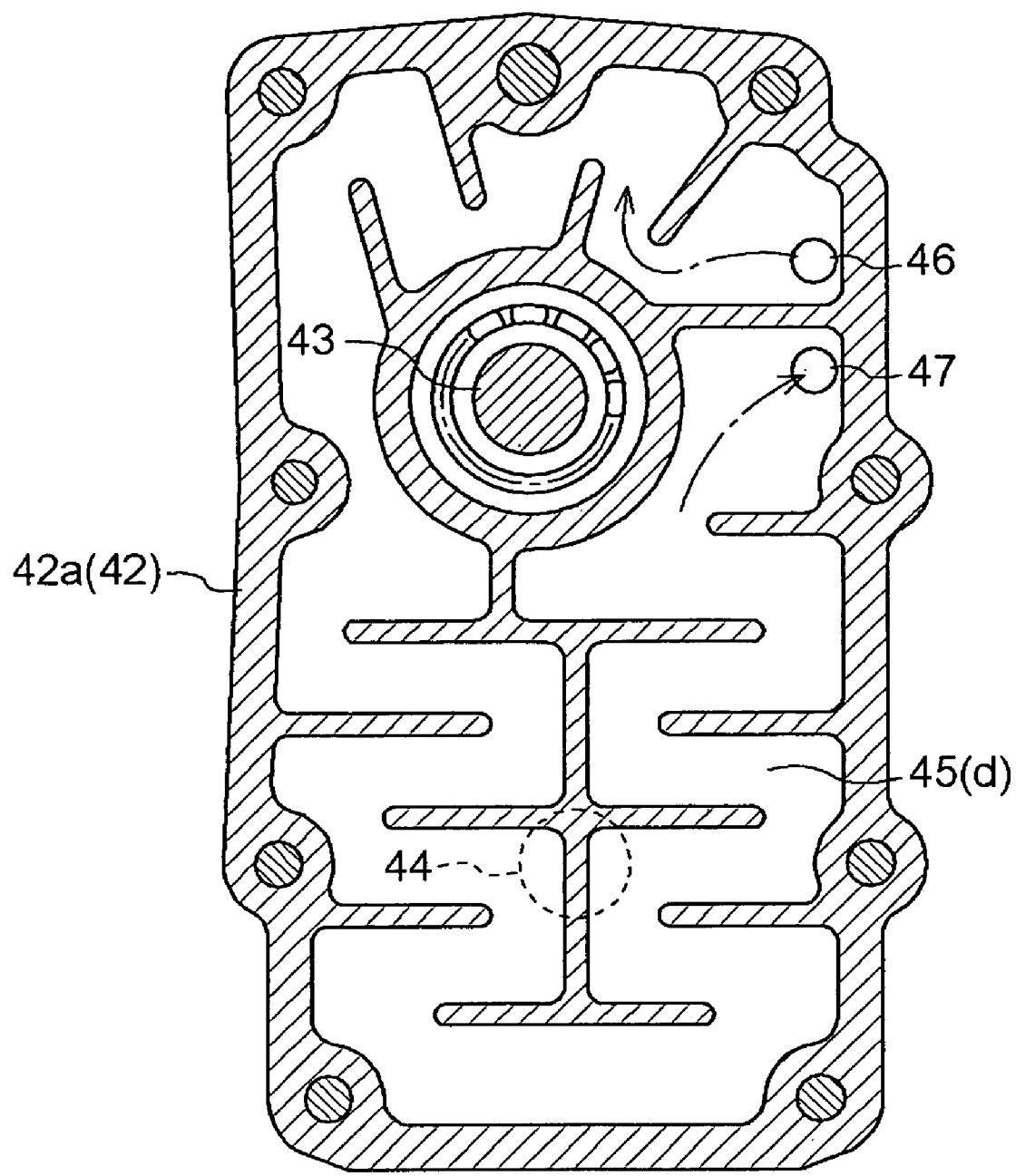
FIG. 7 is a cross-sectional front view of a port block.

The port block 42 has a thick-plate block main body 42a including the speed control fluid paths a and b and the charge fluid path c, and a cover member 42b bolted to a front side of an input side of the block main body 42a. As illustrated in FIG. 7, a meandering groove 45 (cooling hydraulic path) which has more than 10 bends, i.e. winds and turns in a complicated manner is formed on the front side of the block main body 42a. The cover member 42b is linked to the front side of the block main body 42a, so that a meandering hydraulic fluid path is formed in a junction portion of the block main body 42a and the cover member 42b. A hydraulic fluid input hole 46 and a hydraulic fluid output hole 47 are formed at respective ends of this hydraulic path. The hydraulic fluid input hole 46 is in communication with the charge hydraulic fluid path "c" through an excess hydraulic fluid output port of the relief valve 36, while the hydraulic fluid hole 47 is in communication with the transmission case 11. In other words, the meandering hydraulic fluid path formed in the port block 42 forms the hydraulic fluid path d for discharging excess hydraulic fluid.

In addition, the power input shaft 43 is provided with a cooling fan 48. The cooling fan 48 supplies cooling air to an outer surface of the port block 42 from the front. Cooling fins 49 are formed on a front side of the cover member 42b provided on a front side of the port block 42 so that the cover member 42b is efficiently cooled by the cooling fan 48. By forcedly cooling the port block 42 using air in this manner, hydraulic fluid flowing inside the block is cooled, and the hydraulic fluid path d which is caused to detour and flow inside the port block 42 serves as a hydraulic fluid path for cooling.

OTHER EXAMPLES (1) In the above-described example, the groove 45 formed on the front side of the block main body 42a is sealed with the flat junction side of the cover member 42b to form the cooling hydraulic fluid path d. Conversely, the groove 45 can be formed only on a flat rear side of the cover member 42b to form the cooling hydraulic fluid path d at the junction portion of the block main body 42a and the cover member 42b. Alternatively, grooves 45 facing each other can be formed on the respective junction sides of the block main body 42a and the cover member 42b to form a cooling hydraulic fluid path d which has a large cross-sectional area.

(2) In the above-described example, an excess portion of the charge fluid supplied to the charge fluid path c is caused to flow in the cooling hydraulic fluid path d. Alternatively, a cooling hydraulic fluid path d may be provided between the charging pump CP and the charge fluid path c so that cooled charge fluid can be supplied to the charge fluid path c.

(3) The present invention can be applied to a work vehicle in which the hydrostatic continuously variable transmission 10 (the power input shaft 43) is provided in the vehicle 3, pointing in a lateral direction or in a vertical direction.

(4) The port block body may be integrally formed with the speed change casing (HST casing) 41.

(5) The hydraulic fluid input hole may be in communication with the speed control fluid path in stead of the charge hydraulic fluid path.

What is claimed is:

1. A hydrostatic continuously variable transmission comprising:
   a hydraulic pump;
   a power input shaft engaged with the hydraulic pump to transmit power from a power source to the hydraulic pump;
   a hydraulic motor in hydraulic communication with the hydraulic pump;
   a casing that houses the hydraulic pump and the hydraulic motor;
   a port block mounted to the casing, the port block having a block main body and a cover member connected to a power input side of the block main body, said cover member having an outer surface;
   a cooling hydraulic path provided in the port block in a region where the block main body and the cover member meet, the cooling hydraulic path being connected to a first hydraulic path in the port block, the cooling hydraulic path having a plurality of bends;
   a cooling fan provided on the power input shaft to provide air flow directly to the outer surface of the cover member.

2. A hydrostatic continuously variable transmission as defined in claim 1, wherein
   the port block is generally plate-shaped, and has a speed control hydraulic path and a charge hydraulic path therein, the first hydraulic path being either one of the speed control hydraulic path and the charge hydraulic path.

3. A hydrostatic continuously variable transmission as defined in claim 2, wherein
   the cooling hydraulic path is formed by a groove formed on a surface of the block main body with the cover member covering the groove.

4. A hydrostatic continuously variable transmission as defined in claim 2, further comprising:
   cooling fins formed on an outside surface of the cover member.

5. A hydrostatic continuously variable transmission as defined in claim 2, wherein
   the block main body is integrally formed with the casing.

6. A hydrostatic continuously variable transmission as defined in claim 2, wherein
   the cover member is a one-piece integral member.

7. A hydrostatic continuously variable transmission as defined in claim 2, wherein
   the cooling hydraulic path has a hydraulic fluid input hole in communication with the first hydraulic path and a hydraulic fluid output hole, and wherein the hydraulic fluid input hole and the hydraulic fluid output hole are provided in a region above a vertical center of the port block.

8. A hydrostatic continuously variable transmission as defined in claim 7, wherein
   the hydraulic fluid input hole and the hydraulic fluid output hole are separated by one wall.

9. A hydrostatic continuously variable transmission as defined in claim 2, wherein
   the block main body is a one-piece integral member.

10. A hydrostatic continuously variable transmission as defined in claim 1, wherein
    the cooling hydraulic path has more than 10 bends.

11. A hydrostatic continuously variable transmission as defined in claim 1, wherein
    the power input shaft extends through the port block.

12. A hydrostatic continuously variable transmission as defined in claim 1, wherein
    the cooling hydraulic path is formed in an area that substantially covers a cross section of the port block at which the cooling hydraulic path is formed.

* * * * *